US012448262B2

(12) United States Patent
Kawauchi et al.

(10) Patent No.: US 12,448,262 B2
(45) Date of Patent: Oct. 21, 2025

(54) FORKLIFT

(71) Applicant: MITSUBISHI HEAVY INDUSTRIES, LTD., Tokyo (JP)

(72) Inventors: Naoto Kawauchi, Tokyo (JP); Tatsuya Sato, Tokyo (JP); Tetsuhei Kobayashi, Tokyo (JP); Megumu Tsuruta, Tokyo (JP); Kensuke Futahashi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 372 days.

(21) Appl. No.: 18/113,831

(22) Filed: Feb. 24, 2023

(65) Prior Publication Data

US 2023/0294967 A1 Sep. 21, 2023

(30) Foreign Application Priority Data

Mar. 15, 2022 (JP) ................................ 2022-040296

(51) Int. Cl.
*B66F 9/075* (2006.01)

(52) U.S. Cl.
CPC ................................ *B66F 9/07522* (2013.01)

(58) Field of Classification Search
CPC .................................. B66F 9/10; B66F 9/122
See application file for complete search history.

(56) References Cited

U.S. PATENT DOCUMENTS 4,365,921 A * 12/1982 Brouwer ............. B66F 9/07563 414/416.11
4,415,302 A * 11/1983 Brouwer ................. B66F 9/195 414/664
4,998,858 A * 3/1991 Magens .................. B66F 9/122 414/500
5,112,183 A * 5/1992 Nusbaum ............ B66F 9/07545 414/544

(Continued)

FOREIGN PATENT DOCUMENTS

JP 2002-068692 A 3/2002
JP 2008-266011 A 11/2008

*Primary Examiner* — Mark C Hageman
(74) *Attorney, Agent, or Firm* — Osha Bergman Watanabe & Burton LLP

(57) ABSTRACT

A forklift includes a vehicle including a pair of straddle legs extending forward from a lower part of a vehicle body and provided at an interval in a vehicle width direction, a cargo handling device including a mast provided between the pair of straddle legs and extending in an up-down direction, a lift bracket provided at the mast such that the lift bracket is capable of being raised and lowered, and a pair of forks extending forward from the lift bracket, a reach mechanism including an advance/retract drive unit capable of performing advance/retract drive in a front-back direction on each of the pair of straddle legs, and a coupling portion coupling the mast and the advance/retract drive unit, in which the coupling portion includes a protrusion provided at one of the advance/retract drive unit and the mast and extending in the up-down direction toward the other of the advance/retract (Continued)

drive unit and the mast, and an accommodating portion provided at the other of the advance/retract drive unit and the mast and including an accommodating hole into which the protrusion is inserted from the up-down direction with a gap.

5 Claims, 9 Drawing Sheets

(56) References Cited

U.S. PATENT DOCUMENTS 5,879,124 A * 3/1999 Brouwer .................. B66F 9/10 180/209
6,027,303 A * 2/2000 Voegeli .................... B66F 9/10 414/667

* cited by examiner

FORKLIFT

CROSS-REFERENCE TO RELATED APPLICATIONS

This application claims the benefit of priority to Japanese Patent Application Number 2022-040296 filed on Mar. 15, 2022. The entire contents of the above-identified application are hereby incorporated by reference.

TECHNICAL FIELD

The disclosure relates to a forklift.

RELATED ART

A forklift includes a reach mechanism that moves a fork in a front-back direction. In some reach mechanisms, a cylinder is arranged behind a mast, for example, and the cylinder is expanded and contracted to integrally move the mast and the fork in the front-back direction. In this case, the reach mechanisms need to have, at the rear, a dead space corresponding to the cylinder, in addition to a stroke of the fork in the front-back direction, which tends to increase the entire length of the vehicle body.

In view of this problem, for example, a reach mechanism of a forklift of JP 2002-68692 A includes a drive mechanism that moves a mast back and forth in parallel via points of application of force at a lower part and an intermediate part of the mast. In the drive mechanism, each point of application of force of the mast is formed by a rack and a pinion.

SUMMARY

However, in the forklift described in JP 2002-68692 A, a rack and a pinion may be misaligned due to warping and inclination of the mast caused by a load, and the facing relationship between the rack and the pinion may be obstructed. That is, misalignment may occur in the reach mechanism.

The disclosure has been made to solve the above problem, and an object is to provide a forklift capable of suppressing misalignment of a reach mechanism while shortening an entire length in a front-back direction.

In order to solve the above problem, a forklift according to the disclosure includes: a vehicle capable of traveling on a road surface, the vehicle including a vehicle body and a pair of straddle legs extending forward from a lower part of the vehicle body and provided at an interval in a vehicle width direction, a cargo handling device including a mast provided between the pair of straddle legs and extending in an up-down direction, a lift bracket provided at the mast such that the lift bracket is capable of being raised and lowered, and a pair of forks extending forward from the lift bracket, a reach mechanism including an advance/retract drive unit capable of performing advance/retract drive in a front-back direction on each of the pair of straddle legs, and a coupling portion coupling the mast and the advance/retract drive unit, in which the coupling portion includes a protrusion provided at one of the advance/retract drive unit and the mast and extending in the up-down direction toward the other of the advance/retract drive unit and the mast, and an accommodating portion provided at the other of the advance/retract drive unit and the mast and including an accommodating hole into which the protrusion is inserted from the up-down direction with a gap.

According to a forklift of the disclosure, it is possible to suppress misalignment of a reach mechanism while shortening an entire length in a front-back direction.

BRIEF DESCRIPTION OF DRAWINGS

The disclosure will be described with reference to the accompanying drawings, wherein like numbers reference like elements.

DESCRIPTION OF EMBODIMENTS

First Embodiment

Forklift

Hereinafter, a forklift 1 according to a first embodiment of the disclosure will be described with reference to FIGS. 1 to 10.

In the present embodiment, the forklift 1 is used to load and unload cargoes on shelves in a warehouse, and can travel on a passage in the warehouse.

For example, the forklift 1 is an unmanned forklift.

Figure 1:
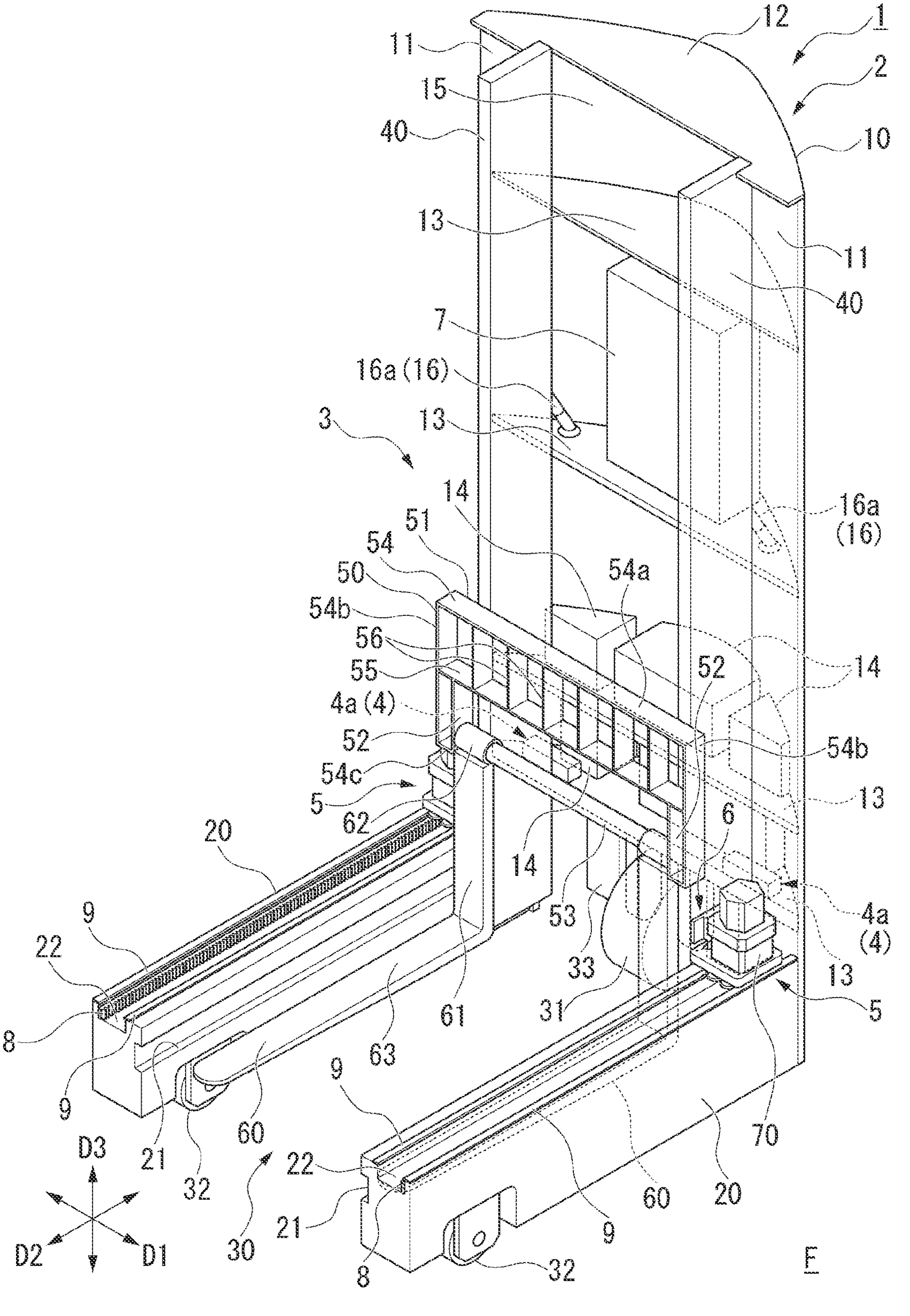
FIG. 1 is a perspective view of a forklift according to a first embodiment of the disclosure.
Figure 2:
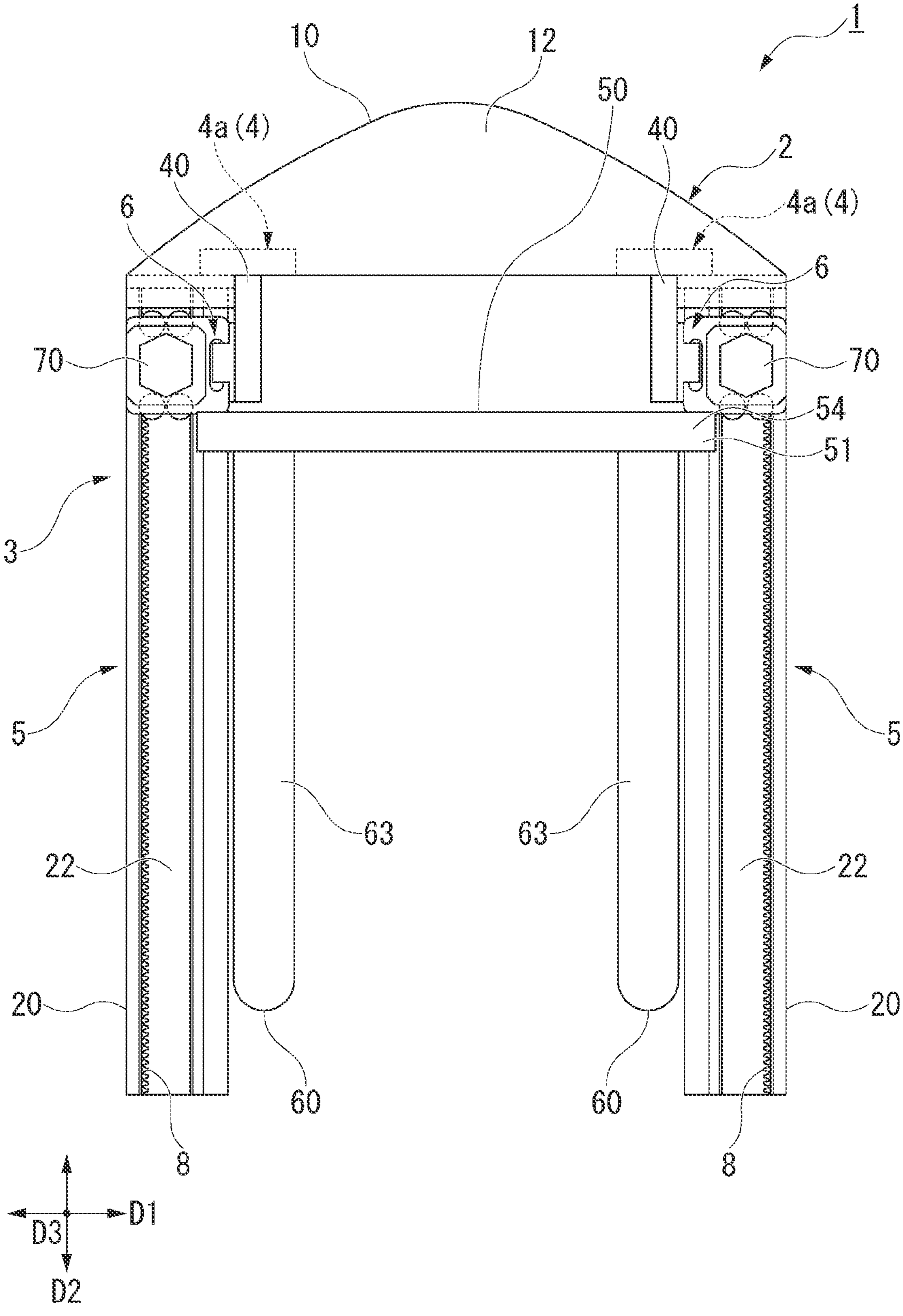
FIG. 2 is a plan view of the forklift according to the first embodiment of the disclosure.
Figure 3:
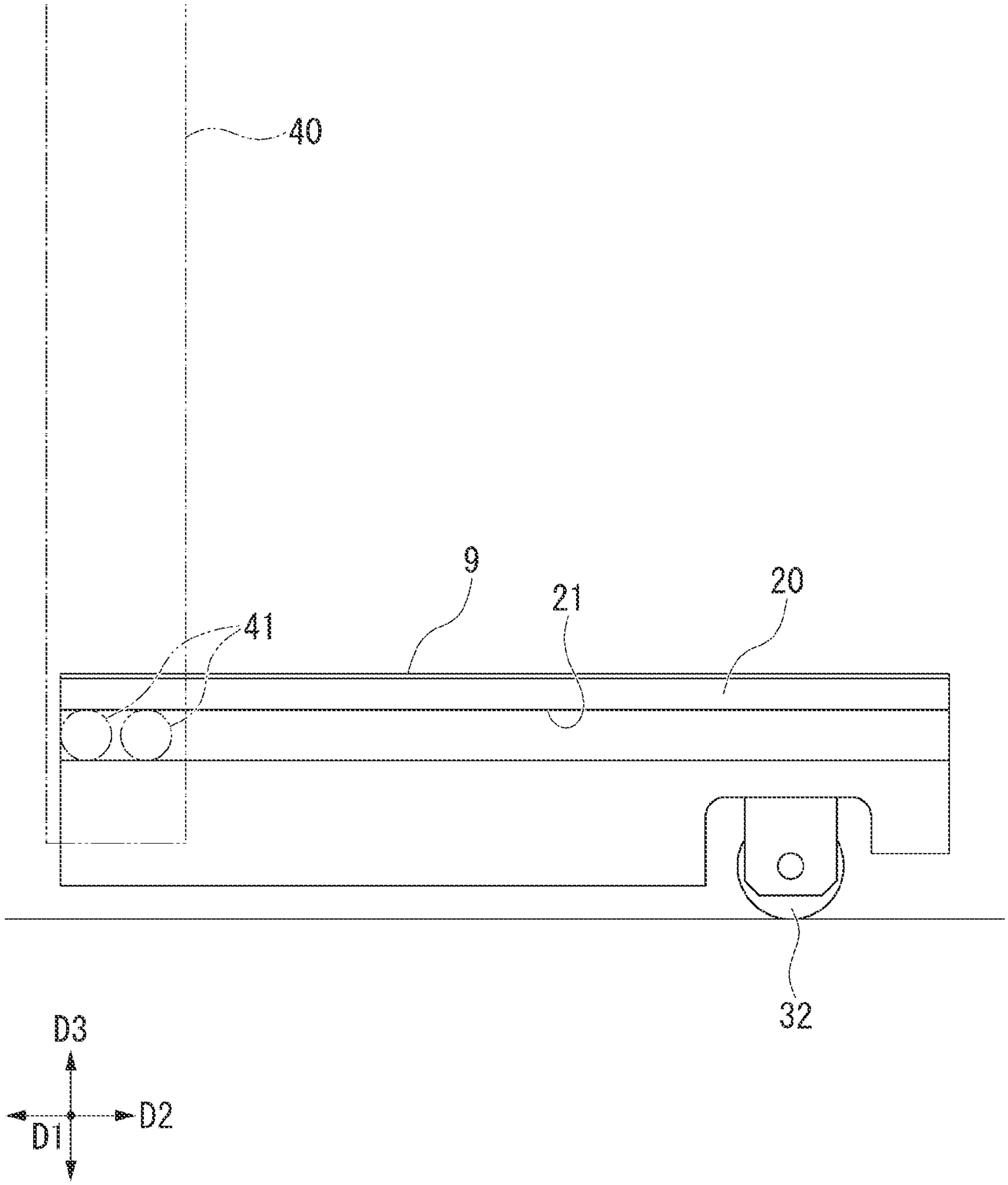
FIG. 3 is a side view of a straddle leg according to the first embodiment of the disclosure as viewed from the inside in a vehicle width direction.

As illustrated in FIGS. 1 and 2, the forklift 1 includes a vehicle 2, a cargo handling device 3, a raising/lowering mechanism 4, a tilt mechanism 16, a reach mechanism 5, a coupling portion 6, and a control unit 7.

Vehicle

Hereinafter, a vehicle width direction D1 of the vehicle 2 may be simply referred to as "vehicle width direction D1", a front-back direction D2 of the vehicle 2 may be simply referred to as "front-back direction D2", and an up-down direction D3 of the vehicle 2 may be simply referred to as "up-down direction D3". The left and right in the vehicle width direction D1 may be simply referred to as "left and right".

The vehicle 2 includes a vehicle body 10, a straddle leg 20, and a travel mechanism 30.

Vehicle Body

The vehicle body 10 extends in the up-down direction D3.

The vehicle body 10 includes a frame 11, a cap 12, a bracket 13, a weight 14, and a cover 15.

A pair of the frames 11 are provided at an interval in the vehicle width direction D1. The frame 11 extends in the up-down direction D3.

The cap 12 is provided at an upper part of the frame 11. The trailing edge of the cap 12 is formed in a U shape convex backward as viewed from the up-down direction D3. The cap 12 couples the upper ends of the pair of frames 11.

A plurality of the brackets 13 are provided at intervals in the up-down direction D3 at rear parts of the frames 11 and below the cap 12. The bracket 13 is a plate-shaped member extending in the vehicle width direction D1. The trailing edge of the bracket 13 is formed in a U shape protruding backward as viewed from the up-down direction D3. Each bracket 13 couples the pair of frames 11.

The weight 14 is attached to the two lower brackets 13.

The cover 15 is provided so as to cover the frames 11, the brackets 13, and the weight 14 from the rear. The cover 15 is attached so as to extend downward from the trailing edge of the cap 12. The cover 15 extends in the up-down direction D3. The cover 15 is formed in a U shape that opens forward as viewed from the up-down direction D3.

Straddle Leg

A pair of the straddle legs 20 are provided at an interval in the vehicle width direction D1 and extend forward from the lower part of the vehicle body 10. A rear end of the straddle leg 20 is connected to the lower end of the frame 11.

The straddle leg 20 includes a mast guiding groove 21 and a reach groove 22.

Mast Guiding Groove

The mast guiding groove 21 is provided on an inner surface of the straddle leg 20 in the vehicle width direction D1. The mast guiding groove 21 extends in the front-back direction D2 (see FIG. 3). The mast guiding groove 21 is formed in a U shape that opens inward in the vehicle width direction D1 as viewed from the front-back direction D2.

Reach Groove

The reach groove 22 is provided on the upper surface of the straddle leg 20. The reach groove 22 extends in the front-back direction D2 (see FIG. 2). The reach groove 22 is formed in a U shape that opens upward as viewed from the front-back direction D2.

Travel Mechanism

The travel mechanism 30 includes a first wheel 31, a second wheel 32, and a travel drive source 33.

The first wheel 31 is provided on the vehicle body 10. The first wheel 31 is attached to a lower surface of the lowermost bracket 13. The first wheel 31 is grounded to a road surface F. A pair of the second wheels 32 are provided at an interval in the vehicle width direction D1. The second wheel 32 is provided at the front end of the straddle leg 20. The second wheel 32 is grounded to the road surface F. The travel drive source 33 is attached to the bracket 13 in the vehicle body 10. The travel drive source 33 drives the first wheel 31.

The vehicle 2 can travel on the road surface F by the travel mechanism 30.

Cargo Handling Device

The cargo handling device 3 includes a mast 40, a lift bracket 50, and a fork 60.

Mast

The mast 40 is provided between the pair of straddle legs 20. A pair of the masts 40 are provided at an interval in the vehicle width direction D1. The mast 40 extends in the up-down direction D3.

The mast 40 includes a mast guiding roller 41.

Mast Guiding Roller

Figure 4:
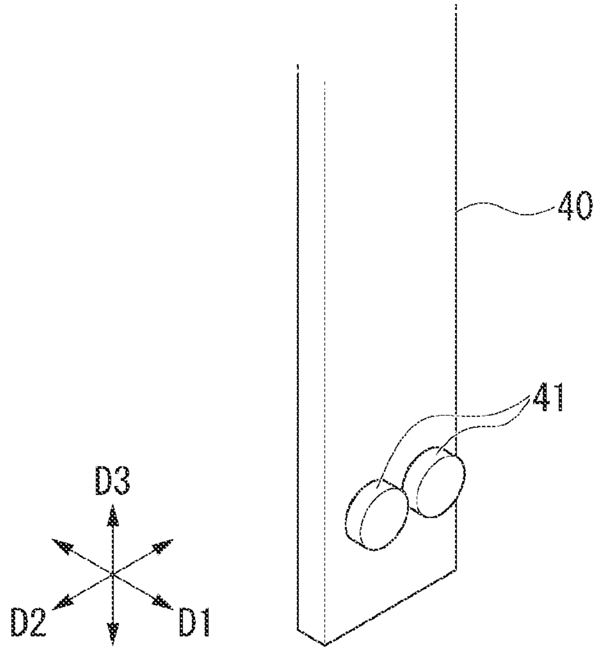
FIG. 4 is a perspective view of a mast lower part according to the first embodiment of the disclosure.

As illustrated in FIG. 4, two of the mast guiding rollers 41 are provided on the outer surface of the lower part of the mast 40 in the vehicle width direction D1. The two mast guiding rollers 41 are arranged side by side in the front-back direction D2. The mast guiding rollers 41 are arranged in the mast guiding groove 21 of the straddle leg 20 (see FIG. 3). The diameter dimension of the mast guiding roller 41 is substantially the same as the width dimension of the mast guiding groove 21 of the straddle leg 20. The mast guiding rollers 41 are supported by the straddle leg 20 in the mast guiding groove 21. That is, the mast 40 is supported by the straddle leg 20 at the mast guiding rollers 41. The mast guiding rollers 41 are provided in a rotationally movable manner in the front-back direction D2 in the mast guiding groove 21.

Lift Bracket

As illustrated in FIGS. 1 and 2, the lift bracket 50 is provided in front of the masts 40. The lift bracket 50 is provided across the pair of masts 40. The lift bracket 50 is provided on the masts 40 so as to be able to be raised and lowered.

The lift bracket 50 includes a backrest 51, a support bar 52, and a finger bar 53.

The backrest 51 includes a frame portion 54, a first bar 55, and a second bar 56. The frame portion 54 extends in the vehicle width direction D1. The frame portion 54 includes an upper frame 54*a*, a side frame 54*b*, and a lower frame 54*c*. The upper frame 54*a* extends in the vehicle width direction D1. The side frame 54*b* is provided at each of the both ends of the upper frame 54*a* in the vehicle width direction D1. That is, a pair of the side frames 54*b* are provided apart from each other in the vehicle width direction D1. The side frames 54*b* extend downward from the both ends of the upper frame 54*a* in the vehicle width direction. The lower frame 54*c* is provided at each of the lower ends of the side frames 54*b*. That is, a pair of the lower frames 54*c* are provided apart from each other in the vehicle width direction D1. Each of the lower frames 54*c* extends inward in the vehicle width direction D1 from the lower end of the side frame 54*b*. The first bar 55 is provided inside the frame portion 54. The first bar 55 extends in the vehicle width direction D1 and couples the side frames 54*b* of the frame portion 54 to each other. The second bar 56 extends in the up-down direction D3 and couple the upper frame 54*a* of the frame portion 54 and the first bar 55. A plurality of the second bars 56 are provided at intervals in the vehicle width direction D1.

The support bar 52 is provided under the first bar 55 inside the frame portion 54. The support bar 52 extends in the up-down direction D3 and couples the first bar 55 and the inner end of the lower frame 54*c* in the vehicle width direction D1. A pair of the support bars 52 are provided at an interval in the vehicle width direction D1.

The finger bar 53 is provided between the pair of support bars 52. The finger bar 53 extends in the vehicle width direction D1 and couples the pair of support bars 52.

Fork

A pair of the forks 60 are provided apart from each other in the vehicle width direction D1 and extend forward from the lift bracket 50. The pair of forks 60 are provided inside in the vehicle width direction D1 relative to the pair of straddle legs 20. The fork 60 is formed in an L shape as viewed from the vehicle width direction D1.

The fork 60 includes a fork base portion 61, a claw portion 63, and a hook portion 62.

The fork base portion 61 extends in the up-down direction D3. The claw portion 63 protrudes forward from the lower end of the fork base portion 61. The claw portion 63 extends in the front-back direction D2. The hook portion 62 is provided at the upper end of the fork base portion 61. The hook portions 62 are engaged with the finger bar 53. The forks 60 are attached to the lift bracket 50 by engagement between the hook portions 62 and the finger bar 53.

Raising/Lowering Mechanism

The raising/lowering mechanism 4 includes a raising/lowering drive source 4*a*. The raising/lowering drive source 4*a* is attached to the bracket 13 in the vehicle body 10. The raising/lowering mechanism 4 raises and lowers the lift bracket 50 and the forks 60 in the up-down direction D3 by a driving force of the raising/lowering drive source 4*a*.

Tilt Mechanism

The tilt mechanism 16 is provided at each of the pair of masts 40. The tilt mechanism 16 includes a tilt cylinder 16*a*. When each mast 40 and the vehicle body 10 approach each other, the tilt mechanism 16 enables the mast 40 to be tilted so that the mast 40 can be changed by the tilt cylinder 16*a* between a state in which the mast 40 extends in the up-down direction orthogonal to the road surface F and a state in which the mast 40 is inclined with respect to the road surface F.

Reach Mechanism

A pair of the reach mechanisms 5 are provided apart from each other in the vehicle width direction D1 on the outside of the forks 60 in the vehicle width direction D1. The reach mechanism 5 includes a guide rail 9, a rack 8, and an advance/retract drive unit 70.

Guide Rail

The guide rail 9 is provided on the upper surface of the straddle leg 20. A pair of the guide rail 9 are provided at an interval in the vehicle width direction D1 and extend in the front-back direction D2 along the straddle leg 20. The guide rail 9 is formed in a plate shape extending in the front-back direction D2. The pair of guide rails 9 are provided so as to sandwich the reach groove 22 from both sides in the vehicle width direction D1. An inner edge 9*a* of the guide rail 9 proximate to the reach groove 22 protrudes from the edge of the reach groove 22 toward the reach groove 22. The inner edge 9*a* of the guide rail 9 is formed in a V shape as viewed from the front-back direction D2 so as to gradually taper toward the reach groove 22.

Rack

The rack 8 extends in the front-back direction D2 along the straddle leg 20. More specifically, the rack 8 is provided on the outer side surface of the reach groove 22 in the vehicle width direction D1. The rack 8 protrudes toward the reach groove 22 relative to the inner edge 9*a* of the guide rail 9.

Advance/Retract Drive Unit

The advance/retract drive unit 70 is provided on the straddle leg 20. The advance/retract drive unit 70 is capable of performing advance/retract drive in the front-back direction D2 on the straddle leg 20.

Figure 5:
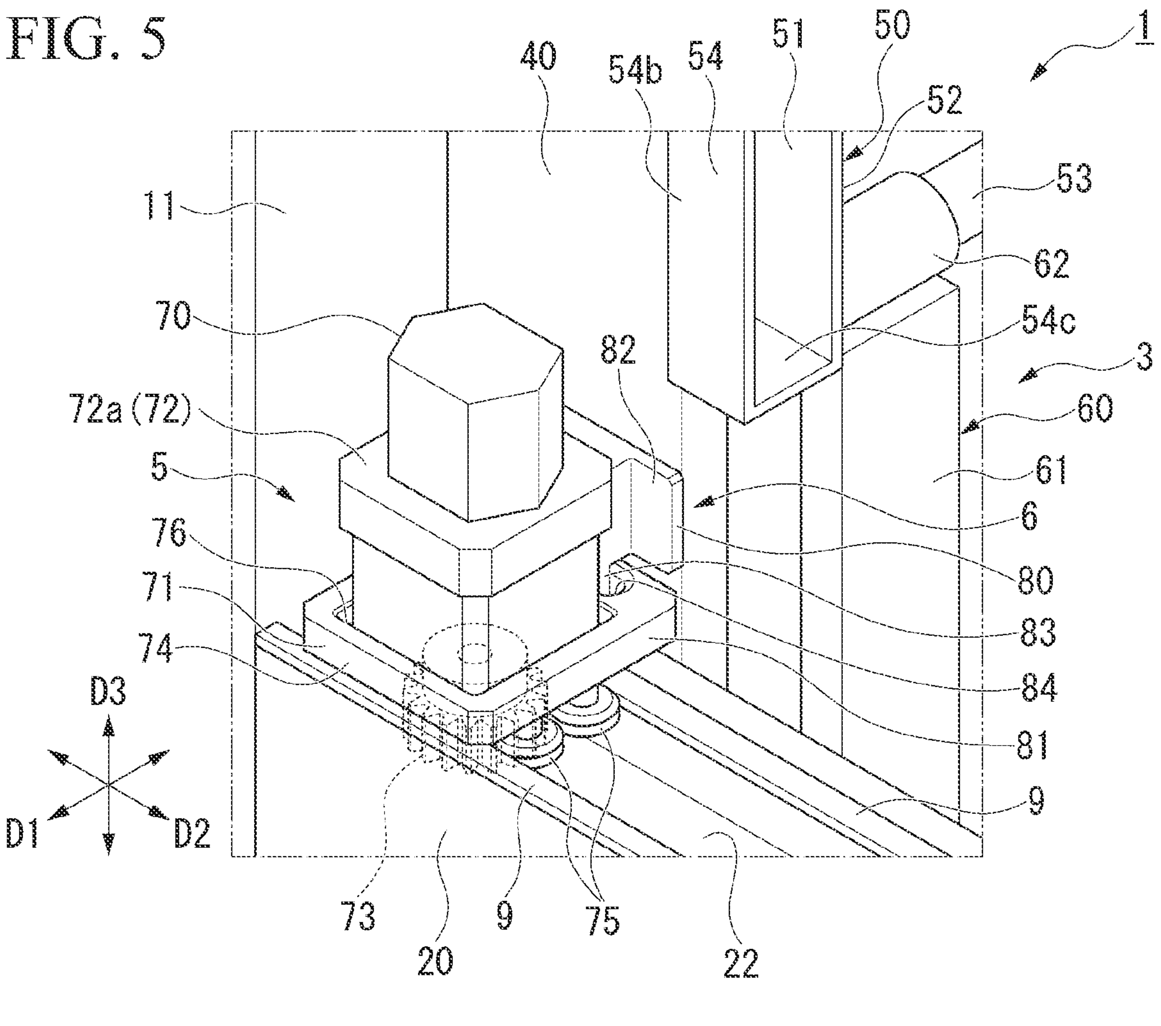
FIG. 5 is a perspective view of an advance/retract drive unit according to the first embodiment of the disclosure.
Figure 6:
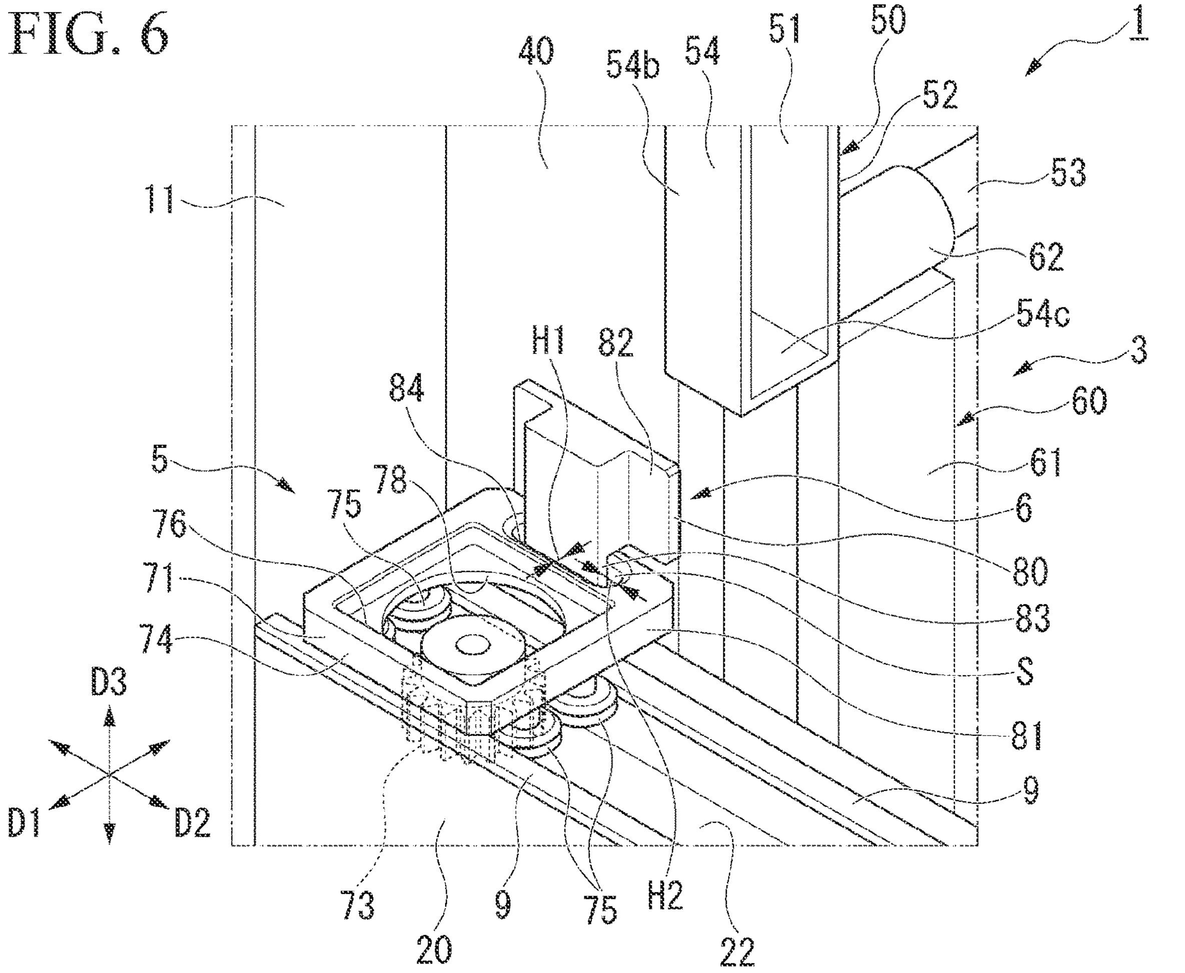
FIG. 6 is a perspective view of the advance/retract drive unit according to the first embodiment of the disclosure, excluding a rotation drive unit.
Figure 7:
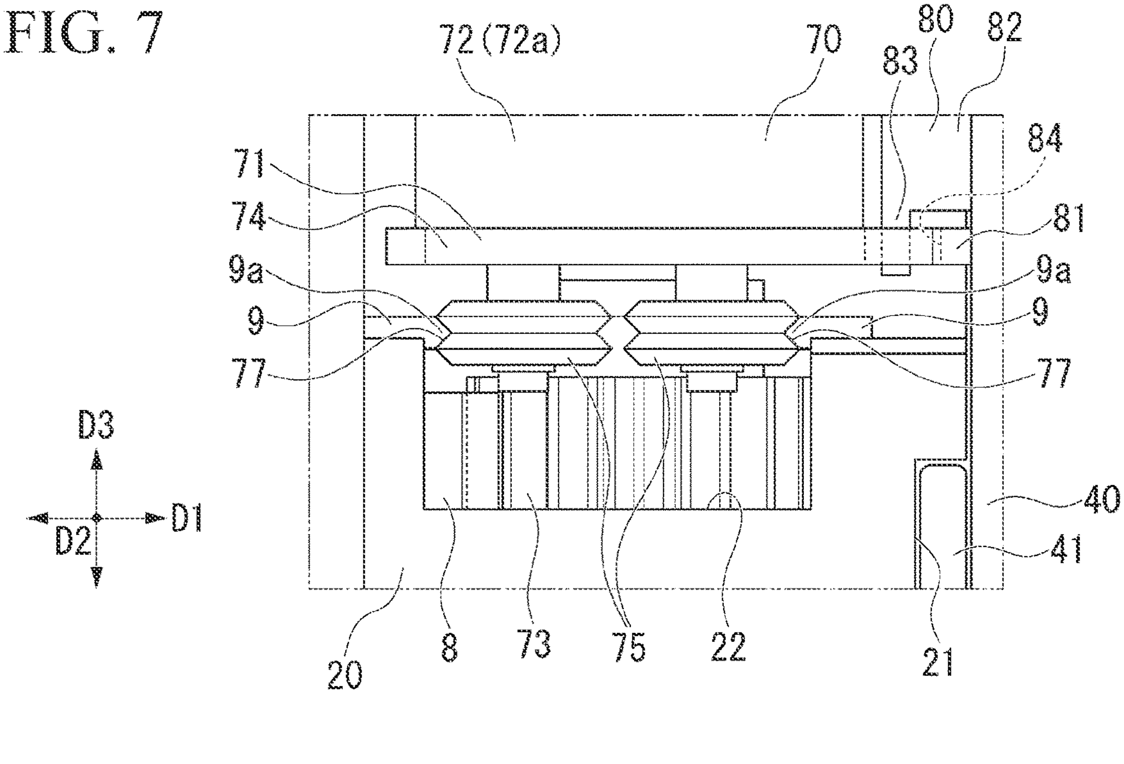
FIG. 7 is a front view of a lower part of the advance/retract drive unit according to the first embodiment of the disclosure as viewed from the front.

As illustrated in FIGS. 5 to 7, the advance/retract drive unit 70 includes a carriage 71, a rotation drive unit 72, and a pinion 73.

Carriage

The carriage 71 is capable of slidably moving in the front-back direction D2 on the straddle leg 20.

The carriage 71 includes a carriage body 74 and a guide roller 75.

Carriage Body

The carriage body 74 is formed in a flat plate shape arranged along the upper surface of the straddle leg 20. The carriage body 74 is formed in a square shape as viewed from the up-down direction D3. The carriage body 74 is arranged slightly apart upward from the guide rail 9. An arrangement groove 76 opened upward is formed in a central portion of the carriage body 74. The arrangement groove 76 is formed in a square shape as viewed from the up-down direction D3. A carriage through-hole 78 extending through the carriage body 74 in the up-down direction D3 is formed in a central portion of the arrangement groove 76. The carriage through-hole 78 is formed in a circular shape as viewed from the up-down direction D3.

Guide Roller

The guide roller 75 is attached to a lower surface of the carriage body 74. The two guide rollers are provided at the front part of the carriage body 74, and the two guide rollers 75 are provided at the rear part of the carriage body 74. That is, a total of the four guide rollers 75 are provided. The front guide rollers 75 and the rear guide rollers 75 are provided so as to sandwich the carriage through-hole 78 from the both sides in the front-back direction D2. The guide roller 75 is attached horizontally so as to be rotatable about a vertical axis.

A guide groove 77 is formed on the outside surface of the guide roller 75. The guide groove 77 is provided over the entire outside surface of the guide roller 75. The guide groove 77 is formed in a V shape as viewed from the circumferential direction of the guide roller 75. The inner edge 9*a* of the guide rail 9 is accommodated in the guide groove 77. The guide roller 75 is provided in a rotationally movable manner in the front-back direction D2 along the guide rail 9 in a state where the inner edge 9*a* of the guide rail 9 is accommodated in the guide groove 77.

Rotation Drive Unit

The rotation drive unit 72 is arranged in the arrangement groove 76 of the carriage body 74 and is fixed to the carriage body 74. The rotation drive unit 72 is a hydraulic motor 72*a*. The rotation drive unit 72 is rotationally driven about the vertical axis. An output shaft (not illustrated) of the rotation drive unit 72 protrudes from the carriage through-hole 78 downward of the carriage body 74. The pinion 73 is attached to the output shaft of the rotation drive unit 72.

Pinion

The pinion 73 is arranged below the carriage body 74. The pinion 73 is arranged horizontally so that the rotor shaft extends in the up-down direction D3. The pinion 73 rotates about the vertical axis by the rotation drive unit 72. The pinion 73 is engaged with the rack 8 and is provided in a rotationally movable manner in the front-back direction D2. The pinion 73 is arranged facing the rack 8.

Coupling Portion

The coupling portion 6 couples the mast 40 and the advance/retract drive unit 70.

The coupling portion 6 includes a protrusion 80 and an accommodating portion 81.

Protrusion

The protrusion 80 is provided on the mast 40. The protrusion 80 extends in the up-down direction D3 toward the advance/retract drive unit 70.

The protrusion 80 has a base portion 82 and an insertion portion 83.

Base Portion

The base portion 82 is rigidly coupled to an outer surface of the mast 40 in the vehicle width direction D1. That is, the base portion 82 is fixed to the mast 40. The fixing method of the base portion 82 may be fastening with a bolt, welding, or the like. The base portion 82 is formed in a rectangular plate shape. The base portion 82 is provided so as to extend in the front-back direction D2 along the surface of the mast 40.

Insertion Portion

The insertion portion 83 is provided on a surface of the base portion 82 opposite to a surface attached to the mast 40. The insertion portion 83 is integrally formed with the base portion 82. The insertion portion 83 is a plate-shaped member along the base portion 82. The insertion portion 83 protrudes downward of the base portion 82.

Accommodating Portion

The accommodating portion 81 is provided at the advance/retract drive unit 70. More specifically, the accommodating portion 81 is provided at an inner edge of the carriage body 74 in the vehicle width direction D1. The accommodating portion 81 is fixed to the carriage body 74. In the present embodiment, the accommodating portion 81 is integrally formed with the carriage body 74. The accommodating portion 81 is formed in a plate shape elongated in the front-back direction D2. The dimension of the accommodating portion 81 in the front-back direction D2 is equal to the dimension of the carriage body 74 in the front-back direction D2. The accommodating portion 81 is arranged below the base portion 82 of the protrusion 80.

The accommodating portion 81 includes an accommodating hole 84 extending through the accommodating portion 81 in the up-down direction D3.

Accommodating Hole

The accommodating hole 84 is formed in an elongated hole shape elongated in the front-back direction D2. The dimension of the accommodating hole 84 in the front-back direction D2 is slightly smaller than the dimension of the arrangement groove 76 in the front-back direction D2. Each end portion of the accommodating hole 84 in the front-back direction D2 is curved in a semicircular shape. The insertion portion 83 of the protrusion 80 is inserted into the accommodating hole 84 from the up-down direction D3 with a gap S therebetween.

Gap Between Accommodating Hole and Protrusion

The gap S between the inside surface of the accommodating hole 84 and the insertion portion 83 of the protrusion 80 extends over the entire periphery of the insertion portion 83. This gap S has an equal dimension H2 in the front-back direction D2 on both sides of the insertion portion 83 in the front-back direction D2, and has an equal dimension H1 in the vehicle width direction D1 on both sides of the insertion portion 83 in the vehicle width direction D1. In this gap S, the dimension H2 in the front-back direction D2 is longer than the dimension H1 in the vehicle width direction D1.

In this manner, the coupling portion 6 has a small joint mechanism in which a flexible mechanism and a rigid mechanism are used in combination. In the flexible mechanism, "backlash" is provided between the mast 40 and the advance/retract drive unit 70 by using the gap S between the protrusion 80 and the accommodating hole 84. In the rigid mechanism, a driving force of the advance/retract drive unit 70 is transmitted by rigidly coupling the protrusion 80 to the mast 40.

Control Unit

The control unit 7 is attached to the bracket 13 in the vehicle body 10. The control unit 7 controls the operations of the travel mechanism 30, the raising/lowering mechanism 4, the reach mechanism 5, and the tilt mechanism 16 according to an input program.

Operation of Forklift

The operation of the forklift 1 when a container CN is placed as a cargo will be described with reference to FIGS. 8 and 9.

Figure 8:
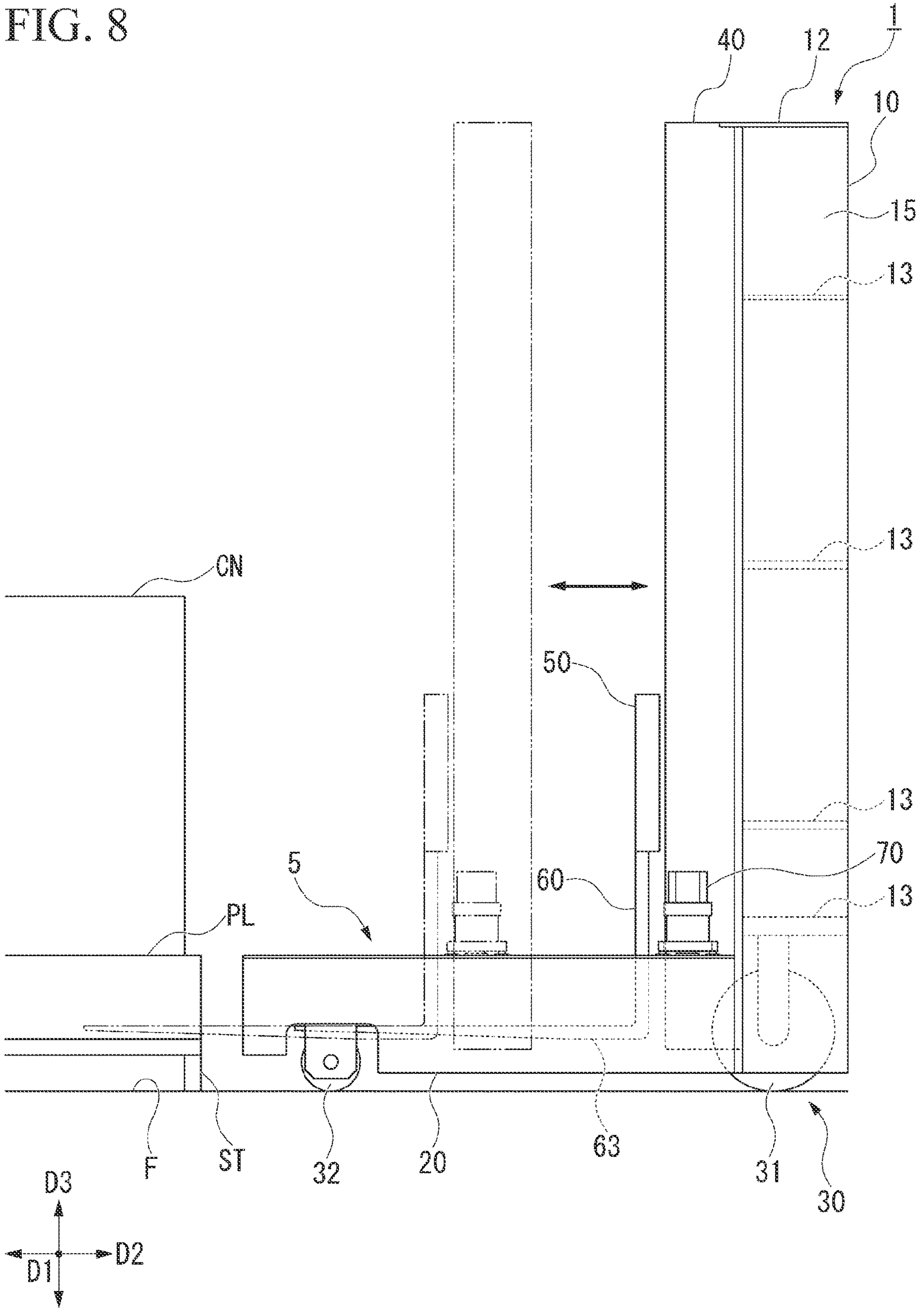
FIG. 8 is a view for describing a fork advance/retract operation of the forklift according to the first embodiment of the disclosure.
Figure 9:
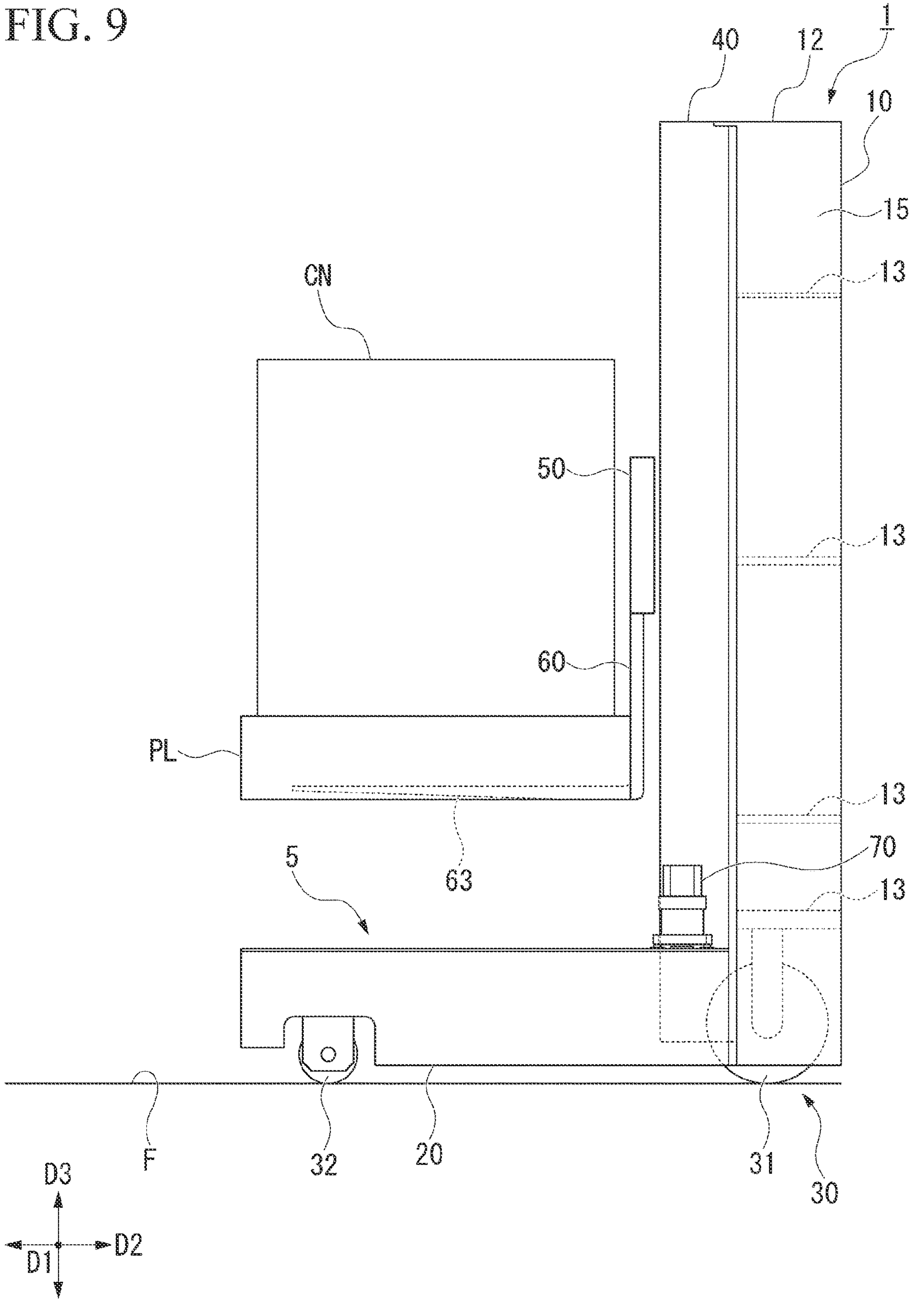
FIG. 9 is a view illustrating a state in which the forklift according to the first embodiment of the disclosure accommodates a container.

As illustrated in FIG. 8, first, the forklift 1 travels by the travel mechanism 30 and approaches the container CN. The container CN is arranged on a pallet PL. Furthermore, the pallet PL is arranged on a base ST.

Subsequently, the forklift 1 advances the forks 60 by the reach mechanisms 5. Specifically, each reach mechanism 5 operates as follows.

First, the rotation drive unit 72 is rotationally driven upon receiving a command from the control unit 7. Then, the pinion 73 is driven to rotate about the vertical axis upon receiving the driving force of the rotation drive unit 72. Thus, the pinion 73 is about to advance forward along the rack 8 while meshing with the rack 8. Then, the entire advance/retract drive unit 70 is about to move forward in a sliding manner along the rack 8. Then, the inside surface of the accommodating hole 84 abuts on the protrusion 80 from the rear, and a forward force acts on the protrusion 80. Due to this, the forward force of the advance/retract drive unit 70 is transmitted to the mast 40, and the mast 40 moves forward in a sliding manner. When the mast 40 is slid forward, the lift bracket 50 and the fork 60 are pushed by the mast 40 and slid forward. Thus, the fork 60 advances and protrudes forward from the straddle leg 20.

When the fork 60 is slid forward, the fork 60 is protruded toward the container CN, and the claw portion 63 of the fork 60 is inserted into the bottom of the pallet PL on which the container CN is placed.

Thereafter, the forklift 1 raises, by the raising/lowering mechanism 4, the fork 60 inserted into the bottom of the pallet PL together with the lift bracket 50. Then, the forklift 1 can lift the container CN by lifting the pallet PL with the upper surface of the claw portion 63 of the fork 60.

Thereafter, the forklift 1 retracts the fork 60 by the reach mechanism 5. The rotation drive unit 72 is rotationally driven in a direction opposite to that in the case of advancing the fork 60. Due to this, the entire advance/retract drive unit 70 is about to move rearward in a sliding manner along the rack 8. Then, the inside surface of the accommodating hole 84 is brought into contact with the protrusion 80 from the front, and a rearward force acts on the protrusion 80. Due to this, the rearward force of the advance/retract drive unit 70 is transmitted to the mast 40, and the mast 40 moves rearward in a sliding manner. When the mast 40 is moved rearward in a sliding manner, the lift bracket 50 and the fork 60 are pushed by the mast 40 and slid rearward. Due to this, as illustrated in FIG. 9, the fork 60 is retracted, and the container CN is accommodated behind the front end of the straddle leg 20 and above the straddle leg 20.

The forklift 1 travels on the road surface F in a state of accommodating the container CN. The fork 60 is protruded by sliding the mast 40 forward. Then, the fork 60 is lowered, so that the container CN can be unloaded to a loading platform of a truck, a floor of a warehouse, a pallet rack in a warehouse, or the like.

Operational Effects

The forklift 1 of the present embodiment includes the reach mechanism 5 including the advance/retract drive unit 70 capable of performing advance/retract drive in the front-back direction D2 on the straddle leg 20, and the coupling portion 6 that couples the mast 40 and the advance/retract drive unit 70.

Due to this, the forklift 1 can advance/retract the fork 60 in the front-back direction D2 by the advance/retract drive of the advance/retract drive unit 70. The advance/retract drive unit 70 performs advance/retract drive on the straddle leg 20. Thus, a stroke behind the mast 40 in the front-back direction D2 is unnecessary as compared with a case where the cylinder is arranged behind the mast 40 and the mast 40 advances/retracts in the front-back direction D2 by expansion/contraction of the cylinder in the front-back direction D2. Accordingly, the entire length of the forklift 1 in the front-back direction D2 can be shortened.

Since the entire length of the forklift 1 in the front-back direction D2 can be shortened, the passage width between the cargoes placed flat on the floor or between the pallet racks in the warehouse can be narrowed. Thus, the number of pallets PL, that can be stored in the warehouse can be increased, and the storage density in the warehouse can be increased.

The coupling portion 6 of the present embodiment includes the protrusion 80 provided on the mast 40 and extending in the up-down direction D3 toward the advance/retract drive unit 70, and the accommodating portion 81 provided on the advance/retract drive unit 70 and including the accommodating hole 84 into which the protrusion 80 is inserted from the up-down direction D3 with the gap S therebetween.

Figure 10:
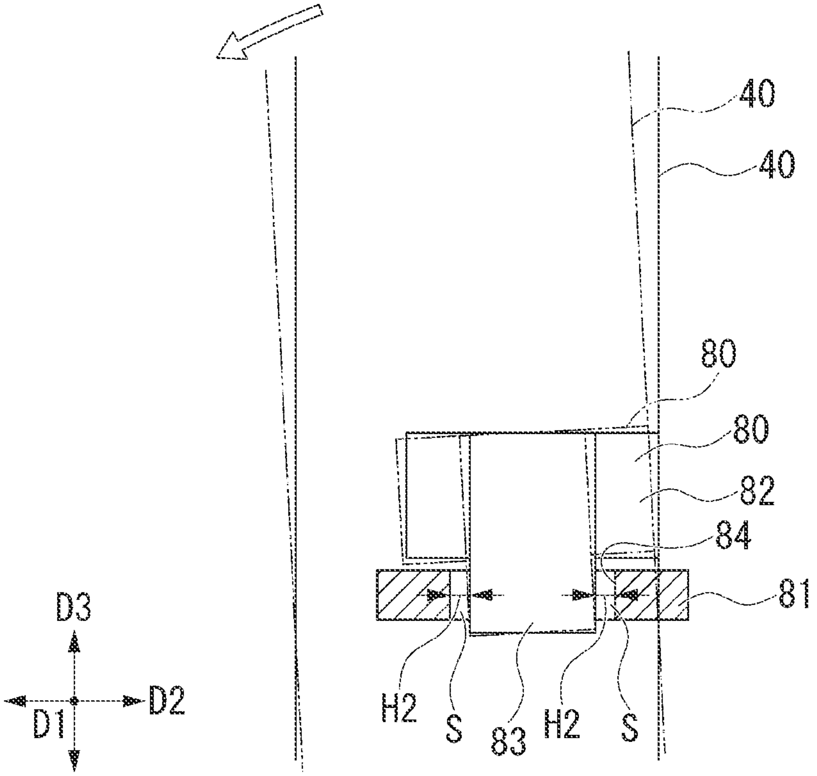
FIG. 10 is a view for describing absorption of misalignment of a mast by a coupling portion according to the first embodiment of the disclosure.

Due to this, as illustrated in FIG. 10, even when the mast 40 is warped or inclined by a load, misalignment between the mast 40 and the advance/retract drive unit 70 can be absorbed by the gap S between the protrusion 80 and the accommodating hole 84. Consequently, it is possible to prevent pitch misalignment between the pinion 73 and the rack 8, and to maintain the facing relationship between the pinion 73 and the rack 8. In this manner, misalignment of the reach mechanism 5 can be suppressed.

According to the present embodiment, the reach mechanism 5 includes the rack 8 extending in the front-back direction D2 along the straddle leg 20. The advance/retract drive unit 70 includes the carriage 71 slidably movable in the front-back direction D2 on the straddle leg 20, the rotation drive unit 72 fixed to the carriage 71 and rotationally driven, and the pinion 73 rotating about the vertical axis by the rotation drive unit 72 and engaged with the rack 8.

This makes it possible to manufacture the reach mechanism 5 with a simple structure at low cost. Furthermore, the pinion 73 can be arranged horizontally so that the rotor shaft extends in the up-down direction D3. This makes it possible to suppress pitch misalignment between the pinion 73 and the rack 8 by a load as compared with the case where the pinion 73 is arranged vertically so that the rotor shaft extends in the horizontal direction. Consequently, it is possible to more reliably maintain the facing relationship between the pinion 73 and the rack 8. Thus, it is possible to further suppress misalignment of the reach mechanism 5.

According to the present embodiment, the reach mechanism 5 includes the guide rail 9 extending in the front-back direction D2 along the straddle leg 20. The carriage 71 includes the guide roller 75 in a rotationally movable manner in the front-back direction D2 along the guide rail 9.

This makes it possible to suppress the pinion 73 from being misaligned from the rack 8 when the carriage 71 advances/retracts in the front-back direction D2. Thus, the carriage 71 can stably advance/retract in the front-back direction D2.

According to the present embodiment, the straddle leg 20 includes the mast guiding groove 21 extending in the front-back direction D2 on the inner surface in the vehicle width direction D1. The mast 40 includes, on the outside in the vehicle width direction D1, the mast guiding roller 41 that is supported by the straddle leg 20 in the mast guiding groove 21 and is rotationally movable in the mast guiding groove 21 in the front-back direction D2.

Due to this, the forklift 1 can stably advance/retract the mast 40 by the mast guiding groove 21 and the mast guiding roller 41. Accordingly, the forklift 1 can stably advance/retract the fork 60. Furthermore, the load of the mast 40 can be supported by the straddle leg 20. This make it possible to suppress the load of the mast 40 from being directly applied to the advance/retract drive unit 70. Consequently, it is possible to more reliably prevent pitch misalignment between the pinion 73 and the rack 8, and more reliably maintain the facing relationship between the pinion 73 and the rack 8. Thus, it is possible to further suppress misalignment of the reach mechanism 5.

According to the present embodiment, in the gap S between the accommodating hole 84 and the protrusion 80, the dimension H2 in the front-back direction D2 is longer than the dimension H1 in the vehicle width direction D1.

Due to this, the coupling portion 6 can satisfactorily absorb warping and inclination of the mast 40 in the front-back direction D2 due to a load. Consequently, it is possible to more reliably prevent pitch misalignment between the pinion 73 and the rack 8, and to more reliably maintain the facing relationship between the pinion 73 and the rack 8. Thus, it is possible to further suppress misalignment of the reach mechanism 5.

Second Embodiment

Hereinafter, a forklift 201 according to a second embodiment of the disclosure will be described with reference to FIG. 11. The same components as those of the first embodiment are denoted by the same reference numerals as those of the first embodiment, and the description will be omitted as appropriate.

Figure 11:
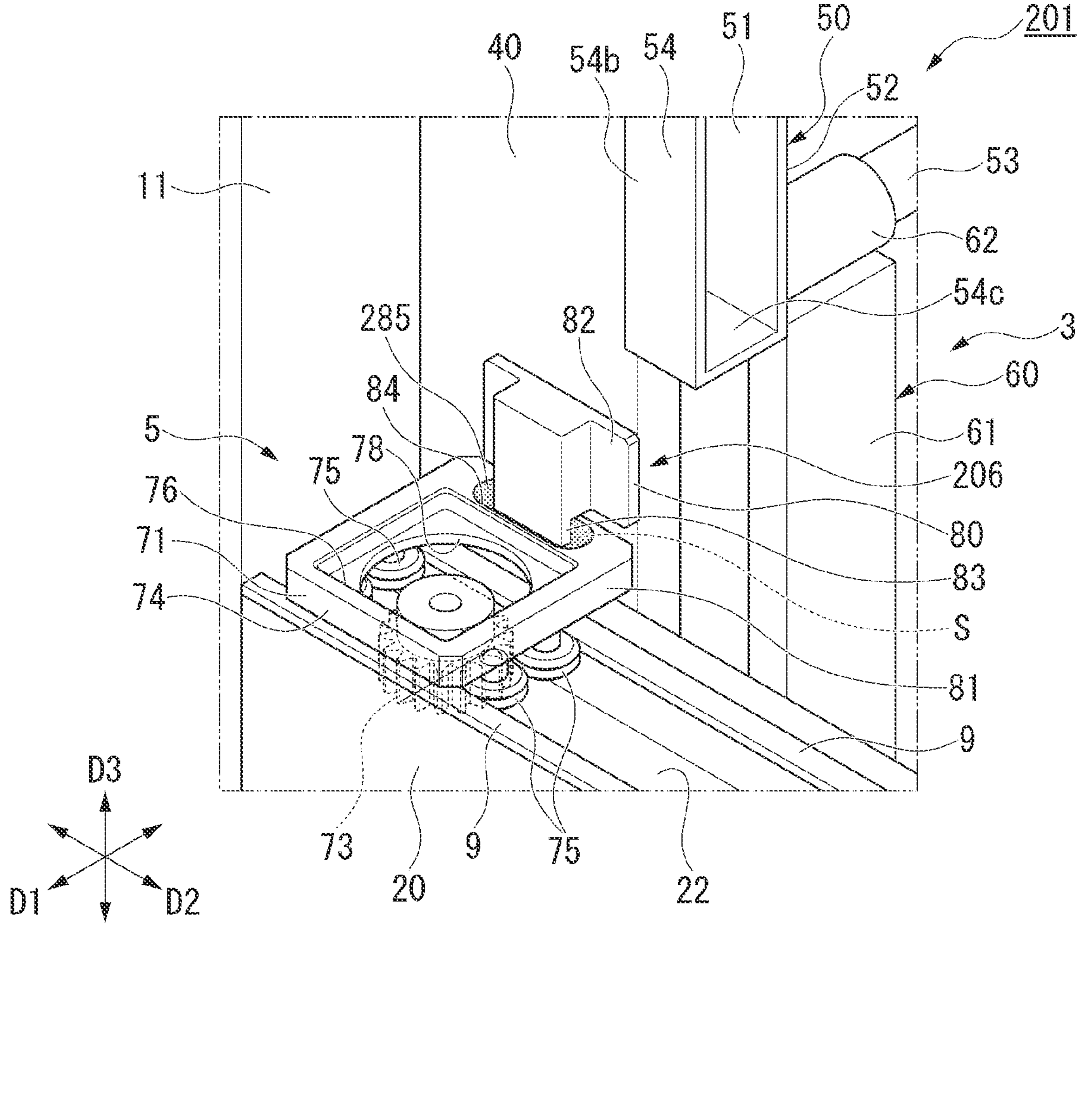
FIG. 11 is a perspective view of an advance/retract drive unit according to a second embodiment of the disclosure, excluding a rotation drive unit.

As illustrated in FIG. 11, the coupling portion 206 includes an elastic body 285 in the gap S between the inside surface of the accommodating hole 84 and the protrusion 80. The elastic body 285 is provided over the entire gap S. The elastic body 285 is, for example, rubber.

According to the present embodiment, the coupling portion 206 includes the elastic body 285 in the gap S between the inside surface of the accommodating hole 84 and the protrusion 80.

Due to this, the forklift 201 can absorb, by the elastic body 285, rattling between the protrusion 80 and the accommodating hole 84. The forklift 201 can absorb misalignment between the mast 40 and the advance/retract drive unit 70 by deformation of the elastic body 285. Consequently, it is possible to prevent pitch misalignment between the pinion 73 and the rack 8, and to maintain the facing relationship between the pinion 73 and the rack 8. Thus, misalignment of the reach mechanism 5 can be suppressed. In this manner, the forklift 201 can absorb misalignment of the reach mechanism 5 by deformation of the elastic body 285 while absorbing, by the elastic body 285, rattling between the protrusion 80 and the accommodating hole 84.

In the second embodiment, the elastic body 285 is provided over the entire gap S, but the disclosure is not limited to this. A plurality of the elastic bodies 285 may be provided at intervals around the insertion portion 83.

Other Embodiments

The embodiments according to the disclosure have been described in detail with reference to the drawings. However, the specific configuration of the disclosure is not limited to these embodiments. Design change without departing from the gist of the disclosure or the like is also included.

In the above embodiments, the rotation drive unit 72 is the hydraulic motor 72*a*, but the disclosure is not limited to this. The rotation drive unit 72 may be, for example, an electric motor.

In the above embodiments, the rotation drive unit 72 is rotationally driven about the vertical axis, but the disclosure is not limited to this. The rotation drive unit 72 may be arranged vertically so as to be rotationally driven about the horizontal axis. In this case, for example, the driving force of the rotation drive unit 72 may be transmitted to the pinion 73 via a gear different from the pinion 73.

In the above embodiment, the pinion 73 is arranged horizontally so that the rotor shaft extends in the up-down direction D3, but the disclosure is not limited to this. The pinion 73 may be arranged vertically so that the rotor shaft extends in the horizontal direction, for example, the vehicle width direction D1. In this case, the rack 8 engaged with the pinion 73 is provided to extend in the front-back direction D2 along the bottom surface of the reach groove 22 of the straddle leg 20.

In the above embodiments, the reach mechanism 5 includes the rack 8 and the pinion 73, but the disclosure is not limited to this. The reach mechanism 5 may include another drive mechanism using wheels or the like instead of the rack 8 and the pinion 73.

In the above embodiments, the mast 40 is provided with the protrusion 80, and the advance/retract drive unit 70 is provided with the accommodating portion 81, but the disclosure is not limited to this. The advance/retract drive unit 70 may be provided with the protrusion 80, and the mast 40 may be provided with the accommodating portion 81.

In the above embodiments, in the gap S between the accommodating hole 84 and the protrusion 80, the dimension H2 in the front-back direction D2 is longer than the dimension H1 in the vehicle width direction D1, but the disclosure is not limited to this. In the gap S between the accommodating hole 84 and the protrusion 80, the dimension H2 in the front-back direction D2 and the dimension H1 in the vehicle width direction D1 may be equal to each other.

In the above embodiments, the guide groove 77 is provided on the outside surface of the guide roller 75, but the disclosure is not limited to this. The guide groove 77 may be provided at an inner edge of the guide rail 9 in the vehicle width direction D1. In this case, the guide roller 75 rotationally moves in the front-back direction D2 along the guide rail 9 in a state where at least a part of the guide roller 75 is accommodated in the guide groove 77.

Notes

The forklift 1, 201 described in each embodiment is understood as follows, for example.

(1) The forklift 1, 201 according to a first aspect includes: the vehicle 2 capable of traveling on the road surface F, the vehicle 2 including the vehicle body 10 and the pair of straddle legs 20 extending forward from a lower part of the vehicle body 10 and provided at an interval in the vehicle width direction D1, the cargo handling device 3 including the mast 40 provided between the pair of straddle legs 20 and extending in the up-down direction D3, the lift bracket 50 provided at the mast 40 such that the lift bracket 50 is capable of being raised and lowered, and the pair of forks 60 extending forward from the lift bracket 50, the reach mechanism 5 including the advance/retract drive unit 70 capable of performing advance/retract drive in the front-back direction D2 on each of the pair of straddle legs 20, and the coupling portion 6, 206 coupling the mast 40 and the advance/retract drive unit 70, in which the coupling portion 6 includes the protrusion 80 provided at one of the advance/retract drive unit 70 and the mast 40 and extending in the up-down direction D3 toward the other of the advance/retract drive unit 70 and the mast 40, and the accommodating portion 81 provided at the other of the advance/retract drive unit 70 and the mast 40 and including the accommodating hole 84 into which the protrusion 80 is inserted from the up-down direction D3 with the gap S.

Due to this, the forklift 1, 201 can advance/retract the fork 60 in the front-back direction D2 by the advance/retract drive of the advance/retract drive unit 70. The advance/retract drive unit 70 performs advance/retract drive on the straddle leg 20. Thus, a stroke behind the mast 40 in the front-back direction D2 is unnecessary as compared with a case where the cylinder is arranged behind the mast 40 and the mast 40 advances/retracts in the front-back direction D2 by expansion/contraction of the cylinder in the front-back direction D2.

Even when the mast 40 is warped or inclined by a load, misalignment between the mast 40 and the advance/retract drive unit 70 can be absorbed by the gap S between the protrusion 80 and the accommodating hole 84.

(2) The forklift 1, 201 of a second aspect is the forklift 1, 201 of (1) in which the reach mechanism 5 may further include the rack 8 extending in the front-back direction D2 along the straddle leg 20, and the advance/retract drive unit 70 may include the carriage 71 slidably movable in the front-back direction D2 on the straddle leg 20, the rotation drive unit 72 fixed to the carriage 71 and rotationally driven, and the pinion 73 rotated about the vertical axis by the rotation drive unit 72 and engaged with the rack 8.

This makes it possible to manufacture the reach mechanism 5 with a simple structure at low cost. Furthermore, the pinion 73 can be arranged horizontally so that the rotor shaft extends in the up-down direction D3. This makes it possible to suppress pitch misalignment between the pinion 73 and the rack 8 by a load as compared with the case where the pinion 73 is arranged vertically so that the rotor shaft extends in the horizontal direction.

(3) A forklift 1, 201 according to a third aspect is the forklift 1, 201 of (2), in which the reach mechanism 5 may further include the guide rail 9 extending in the front-back direction D2 along the straddle leg 20, and the carriage 71 may include the guide roller 75 rotationally movable in the front-back direction D2 along the guide rail 9.

This makes it possible to suppress the pinion 73 from being misaligned from the rack 8 when the carriage 71 advances/retracts in the front-back direction D2.

(4) The forklift 1, 201 according to a fourth aspect is the forklift 1, 201 of any of (1) to (3), in which the straddle leg 20 may include the mast guiding groove 21 extending in the front-back direction D2 on the inner surface in the vehicle width direction D1, and the mast 40 may include the mast guiding roller 41 on the outside in the vehicle width direction D1, the mast guiding roller 41 being supported by the straddle leg 20 in the mast guiding groove 21 and being rotationally movable in the front-back direction D2 in the mast guiding groove 21.

This allows the forklift 1, 201 to stably advance/retract the mast 40 by the mast guiding groove 21 and the mast guiding roller 41. Furthermore, the load of the mast 40 can be supported by the straddle leg 20.

(5) The forklift 201 according to a fifth aspect is the forklift 201 of any of (1) to (4), in which the coupling portion 206 may further include the elastic body 285 in the gap S between the inside surface of the accommodating hole 84 and the protrusion 80.

Due to this, the forklift 201 can absorb, by the elastic body 285, rattling between the protrusion 80 and the accommodating hole 84. The forklift 201 can absorb misalignment between the mast 40 and the advance/retract drive unit 70 by deformation of the elastic body 285.

While preferred embodiments of the invention have been described as above, it is to be understood that variations and modifications will be apparent to those skilled in the art without departing from the scope and spirit of the invention. The scope of the invention, therefore, is to be determined solely by the following claims.

The invention claimed is:

1. A forklift comprising:

a vehicle capable of traveling on a road surface, the vehicle including a vehicle body and a pair of straddle legs extending forward from a lower part of the vehicle body and provided at an interval in a vehicle width direction;

a cargo handling device including a mast provided between the pair of straddle legs and extending in an up-down direction, a lift bracket provided at the mast such that the lift bracket is capable of being raised and lowered, and a pair of forks extending forward from the lift bracket;

a reach mechanism including an advance/retract drive unit capable of performing advance/retract drive in a front-back direction on each of the pair of straddle legs; and a coupling portion coupling the mast and the advance/retract drive unit, wherein the coupling portion includes a protrusion provided at one of the advance/retract drive unit and the mast and extending in the up-down direction toward the other of the advance/retract drive unit and the mast, and an accommodating portion provided at the other of the advance/retract drive unit and the mast and including an accommodating hole extending from an upper surface of the accommodating portion and into which the protrusion is inserted from the up-down direction with a gap.

2. The forklift according to claim 1, wherein one of the straddle legs includes a mast guiding groove extending in the front-back direction on an inner surface in the vehicle width direction, and the mast includes a mast guiding roller on an outside in the vehicle width direction, the mast guiding roller being supported by the one of the straddle legs in the mast guiding groove and being rotationally movable in the front-back direction in the mast guiding groove.

3. The forklift according to claim 1, wherein the coupling portion further includes an elastic body in the gap between an inside surface of the accommodating hole and the protrusion.

4. A forklift comprising:

a vehicle capable of traveling on a road surface, the vehicle including a vehicle body and a pair of straddle legs extending forward from a lower part of the vehicle body and provided at an interval in a vehicle width direction;

a cargo handling device including a mast provided between the pair of straddle legs and extending in an up-down direction, a lift bracket provided at the mast such that the lift bracket is capable of being raised and lowered, and a pair of forks extending forward from the lift bracket;

a reach mechanism including an advance/retract drive unit capable of performing advance/retract drive in a front-back direction on each of the pair of straddle legs; and a coupling portion coupling the mast and the advance/retract drive unit, wherein the coupling portion includes a protrusion provided at one of the advance/retract drive unit and the mast and extending in the up-down direction toward the other of the advance/retract drive unit and the mast, and an accommodating portion provided at the other of the advance/retract drive unit and the mast and including an accommodating hole into which the protrusion is inserted from the up-down direction with a gap, the reach mechanism further includes a rack extending in the front-back direction along one of the straddle legs, and the advance/retract drive unit includes a carriage slidably movable in the front-back direction on the one of the straddle legs, a rotation drive unit fixed to the carriage and configured to be rotationally driven, and a pinion configured to be rotated about a vertical axis by the rotation drive unit and engaged with the rack.

5. The forklift according to claim 4, wherein the reach mechanism further includes a guide rail extending in the front-back direction along the one of the straddle legs, and the carriage includes a guide roller rotationally movable in the front-back direction along the guide rail.

* * * * *